July 5, 1949.                F. O. BUDNIK                2,475,277
       PLASTIC BAG HAVING FUSED SEAMS BETWEEN WALL-FORMING
                  STRIPS AND SLIDE-FASTENER TAPES
Filed Sept. 19, 1947                            2 Sheets-Sheet 1

INVENTOR.
FRANK D. BUDNICK
By Harry W. Hitzeman
      ATTORNEY.

July 5, 1949. F. O. BUDNIK 2,475,277
PLASTIC BAG HAVING FUSED SEAMS BETWEEN WALL-FORMING
STRIPS AND SLIDE-FASTENER TAPES
Filed Sept. 19, 1947 2 Sheets-Sheet 2
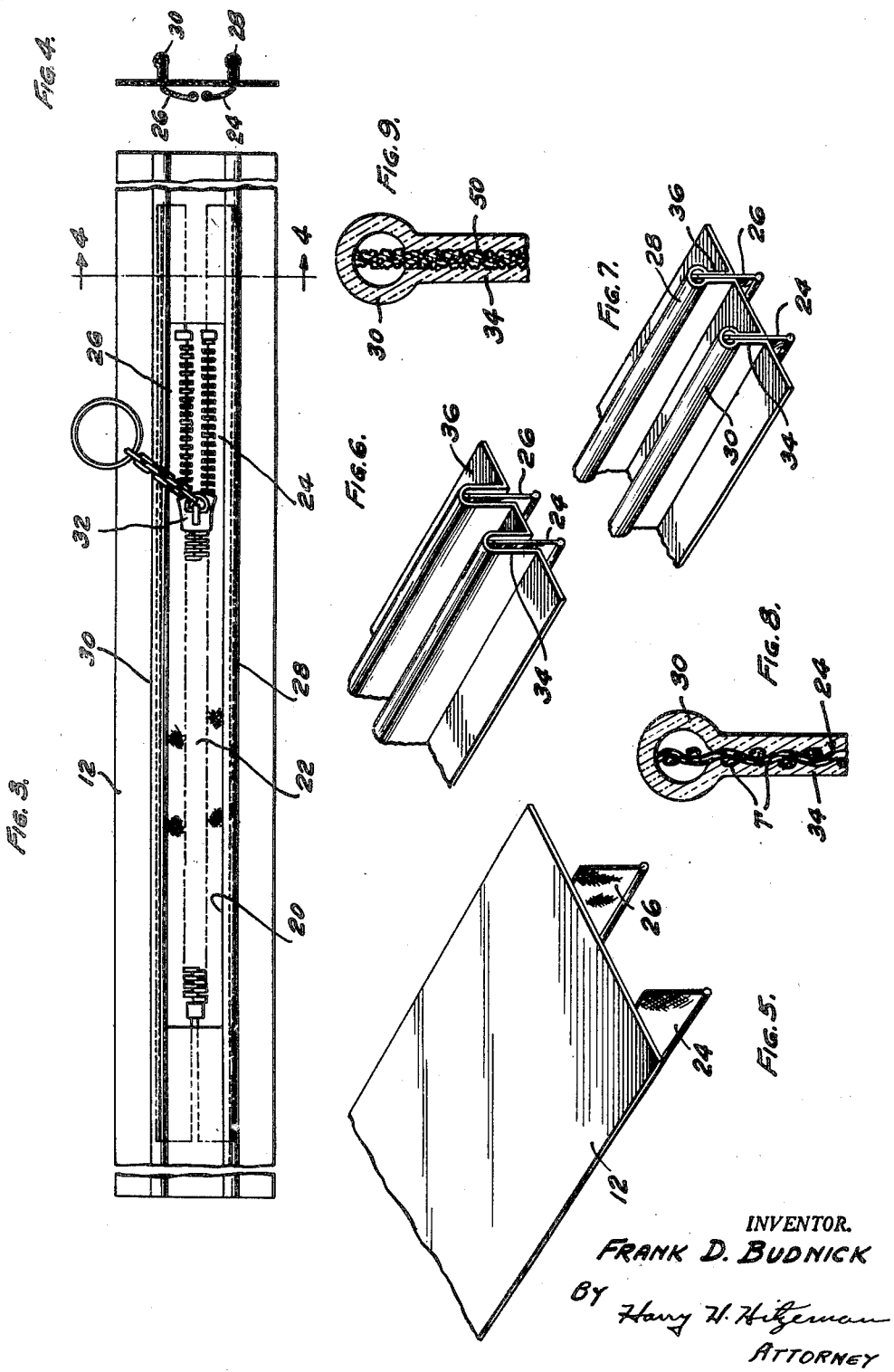
INVENTOR.
FRANK D. BUDNICK
BY Harry H. Hilgeman
ATTORNEY Patented July 5, 1949

2,475,277

UNITED STATES PATENT OFFICE 2,475,277

PLASTIC BAG HAVING FUSED SEAMS BETWEEN WALL-FORMING STRIPS AND SLIDE-FASTENER TAPES

Frank O. Budnik, Chicago, Ill.

Application September 19, 1947, Serial No. 775,037

7 Claims. (Cl. 150—42)

My invention relates to a new and improved method or process of placing interlocking slide or "zipper" fasteners in purses or hand bags and similar products.

My invention relates more particularly to the method of fastening interlocking slide or "zipper" fasteners to plastic fabrics of the type used for manufacturing purses, hand-bags and similar products.

Purses, hand-bags, vanity kits and similar products have been made of different types of plastic fabrics for some time. The various plastic parts can readily be adhered together by welding or fusing the parts together by heat and pressure, thereby forming a bond between the parts inherently as strong as the fabric itself. Heretofore, in connecting cloth to plastic fabric the usual custom has been to sew the part together. Thus, for example, the interlocking slide or "zipper" fastener is usually found in the articles above mentioned, the same being normally supplied connected to two strips of cloth which are sewed in the opening of the bag.

I have found, however, that by applying heat and pressure and placing portions of the plastic fabric on both sides of a piece of cloth, the plastic mass will penetrate the interstices of the cloth from both sides forming a firm bond with the individual strands of thread in the cloth, so that the cloth piece is firmly fixed to the plastic fabric and cannot be removed except by tearing the cloth and the plastic fabric.

The principal object of my invention is to provide an improved process of connecting cloth or other fabric upon which an interlocking slide or "zipper" fastener is located to a flexible plastic fabric.

A further object of the invention is to provide an improved cosmetic kit, hand-bag or similar product constructed in accordance with the above mentioned process or method.

Other objects and advantages will be more apparent from the following description wherein reference is had to the accompanying drawings upon which:

Fig. 3 is a plan view of one of the upper parts of the bag combining therein a plastic strip and the cloth strips upon which the interlocking slide or "zipper" fasteners are mounted;

Fig. 4 is a cross sectional view thereof taken on the line 4—4 of Fig. 3;

Fig. 5 illustrates the first step in assembling together the plastic fabric strip and the cloth strips upon which the interlocking slide or "zipper" fasteners are mounted;

Fig. 6 illustrates the second step in the process;

Fig. 7 illustrates the third step; and

Fig 8 is an enlarged fragmentary cross sectional view showing the manner in which the plastic fabric and the cloth are fused or welded together, and Fig. 9 shows how it may be fused or welded to leather.

Figure 1:
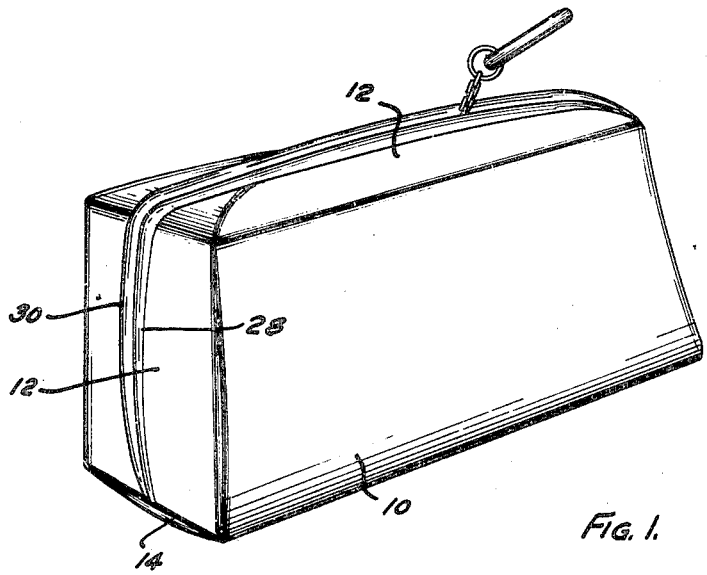
Fig. 1 is a front perspective view of a lady's cosmetic bag or similar product constructed in accordance with my invention.
Figure 2:
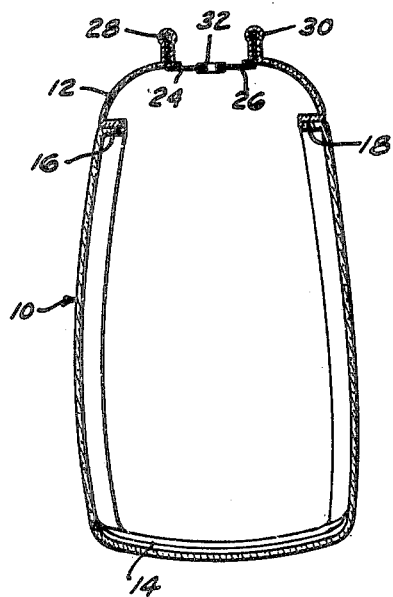
Fig. 2 is a cross sectional view of the same.

In the embodiment of the invention which I have chosen to illustrate and describe the same, I have shown a lady's bag 10 which may be constructed throughout of plastic fabric and may comprise the body portion 10 and the central portion 12 which extends from a point 14 adjacent the lower edge of the bag on one side upwardly along that side across the top and down upon the other side to a similar point where the plastic sections 10 and 12 are welded together, they also being welded together along their meeting edges 16 and 18 throughout the entire length of the strip 12. This is in accordance with the usual process at present employed in fusing together plastic portions in the manufacture of hand-bag or similar objects.

As can be seen in Fig. 3, the strip 12 is provided with a rectangular opening 20 which forms the opening through which access to the bag is obtained, the opening being normally closed by a interlocking slide or "zipper" fastener 22 which has its two sections 24 and 26 firmly held in a pair of upstanding ridge portions 28 and 30 in the plastic fabric strip 12. The usual locking member 32 is provided for the interlocking slide or "zipper" fastener by which the same may be either open or closed, as desired.

The manner in which the cloth strips 24 and 26 are attached to the plastic fabric strip 12 will now be described. Referring to Figs. 5 and 6, the strip 12 is provided with the U-shaped grooves 34 and 36 and the edge of the strips 24 and 26 are inserted therein. Heat and pressure is then applied from both sides of each of the U-shaped grooves 34, resulting in a compression and fusing of the plastic fabric into the cloth strip. The thickness of the plastic fabric and the thickness of the cloth strip will normally determine the exact pressure required as well as the degrees of heat which must be applied. The effect of the heat and pressure as applied upon both sides of the plastic fabric is to cause the plastic material to be flowed among and between the threads T of the cloth strips, thereby creating a bond between the three sections of material; that is, the two thicknesses of plastic fabric and the thickness of the cloth so that under normal wear and tear it is impossible to separate the same. After the cloth strips upon which the interlocking slide or "zipper" fasteners are mounted have been attached to the plastic fabric strip 12, it is a simple matter to weld or fuse together the strip 12 to the body 10 of the bag in the manner described and the entire handbag is assembled.

In Fig. 9 I have shown an enlarged cross-sectional view wherein the layers of plastic fabric are fused or welded to a roughened leather 50 or composition board of the type sometimes used in making purses, etc. In this process, the plastic fabric under heat and pressure is flowed into the irregular surface openings and tends to create an effective bond between the same and the plastic fabric.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. A hand bag constructed of a pair of plastic fabric portions, one being a generally U-shaped body portion and the other being a generally U-shaped central strip portion, said portions forming the top and side walls of said bag when the two portions are welded together, said central strip portion having an elongated central opening therein, and having a pair of parallel elongated grooves positioned upon opposite sides of said opening, a pair of elongated cloth strips secured in said grooves, and interlocking slide fastener members secured to the edges of said cloth strips for closing the opening in said central strip portion.

2. A hand bag constructed of a pair of plastic fabric portions, one being a generally U-shaped body portion and the other being a generally U-shaped central strip portion, said portions forming the top and side walls of said bag when the two portions are welded together, said central strip portion having an elongated central opening therein, and having a pair of parallel elongated grooves positioned upon opposite sides of said opening, a pair of elongated cloth strips secured in said grooves, and interlocking slide fastener members secured to the edges of said cloth strips for closing the opening in said central strip portion, the ends of said grooves forming upstanding re-enforcing ridges.

3. A hand bag constructed of a pair of plastic fabric portions, one being a generally U-shaped body portion and the other being a generally U-shaped central strip portion, said portions forming the top and side walls of said bag when the two portions are welded together, said central strip portion having an elongated central opening therein, and having a pair of parallel elongated grooves positioned upon opposite sides of said opening, one edge of a pair of elongated cloth strips secured between opposed walls of said grooves by being fused to said walls, and interlocking slide fastener members secured to the opposite edges of said cloth strips for closing the opening in said central strip portion.

4. A hand bag constructed of a pair of plastic fabric portions, one being a generally U-shaped body portion and the other being a generally U-shaped central strip portion, said portions forming the top and side walls of said bag when the two portions are welded together, said central strip portion having an elongated central opening therein, and having a pair of upstanding parallel elongated groove-forming ridges positioned upon opposite sides of said opening, a pair of elongated cloth strips secured along one edge in the grooves formed by said ridges by being fused to opposed wall portions of said grooves, and interlocking slide fastener members secured to the opposite edges of said cloth strips for closing the opening in said central strip portion.

5. A hand bag constructed of a pair of plastic fabric portions, one being a generally U-shaped body portion and the other being a generally U-shaped central strip portion, said portions forming the top and side walls of said bag when the two portions are welded together, said central strip portion having an elongated central opening therein, and having a pair of upstanding parallel elongated groove-forming ridges positioned upon opposite sides of said opening, a pair of elongated cloth strips secured along one edge in the grooves formed by said ridges by being fused to opposed wall portions of said grooves, and interlocking slide fastener members secured to the opposite edges of said cloth strips for closing the opening in said central strip portion, the upstanding edges of said ridges having a generally circular cross-section to form a re-enforcing bead therein.

6. A slide fastener tape comprising a strip portion formed of a plastic fabric, said strip portion having an elongated opening therein and having a pair of parallel elongated grooves positioned upon opposite sides of said opening, said opening being surrounded on all sides by said plastic fabric, said grooves extending beyond terminal limits of said opening, a pair of elongated cloth strips secured in said grooves and extending beyond the terminal limits of said opening, and interlocking slide fastener members secured to the edges of said cloth strips for closing the opening in said central strip portion.

7. A slide fastener tape comprising a strip portion formed of a plastic fabric, said strip portion having an elongated opening therein and having a pair of parallel elongated grooves positioned upon opposite sides of said opening, said opening being surrounded on all sides by said plastic fabric, said grooves extending beyond terminal limits of said opening, a pair of elongated cloth strips secured in said grooves and extending beyond the terminal limits of said opening, and interlocking slide fastener members secured to the edges of said cloth strips for closing the opening in said central strip portion, the upstanding edges of said grooves having a generally circular cross-section to form a reinforcing bead therein.

FRANK O. BUDNIK.

REFERENCES CITED

The following references are of record in the file of this patent:

UNITED STATES PATENTS

| Number | Name | Date |
|---|---|---|
| 2,035,593 | Coventry | Mar. 31, 1936 |
| 2,178,611 | Scheidegger | Nov. 7, 1939 |
| 2,224,036 | Van Voorhis | Dec. 3, 1940 |
| 2,236,024 | Tyler | Mar. 25, 1941 |
| 2,368,053 | Van Voorhees | Jan. 23, 1945 |
| 2,368,911 | Andler | Feb. 6, 1945 |
| 2,389,601 | De Witt | Nov. 27, 1945 |
| 2,442,091 | Mann et al. | May 25, 1948 |